United States Patent
Reimann (10) Patent No.: US 11,655,874 B2
(45) Date of Patent: May 23, 2023

(54) VIBRATION DAMPER, AND MOTOR VEHICLE WITH A VIBRATION DAMPER OF THIS TYPE

(71) Applicants: ThyssenKrupp Bilstein GmbH, Ennepetal (DE); thyssenkrupp AG, Essen (DE)

(72) Inventor: Thilo Reimann, Ennepetal (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 122 days.

(21) Appl. No.: 17/095,128

(22) Filed: Nov. 11, 2020

(65) Prior Publication Data
US 2021/0148430 A1    May 20, 2021

(30) Foreign Application Priority Data
Nov. 20, 2019 (DE) ..................... 10 2019 131 319.8

(51) Int. Cl.
*F16F 9/32* (2006.01)
*F16F 9/36* (2006.01)
(Continued)

(52) U.S. Cl.
CPC ............ *F16F 9/3271* (2013.01); *B60G 13/08* (2013.01); *F16F 9/185* (2013.01); *F16F 9/3242* (2013.01);
(Continued)

(58) Field of Classification Search
CPC .......... F16F 9/062; F16F 9/185; F16F 9/3235; F16F 9/3242; F16F 9/362; F16F 9/364;
(Continued)

(56) References Cited

U.S. PATENT DOCUMENTS

| 2,717,669 | A | * | 9/1955 | Stock | ........................ | F16F 9/19 188/315 |
| 3,225,870 | A | * | 12/1965 | Heckethorn | ............ | F16F 9/185 188/269 |

(Continued)

FOREIGN PATENT DOCUMENTS

| CN | 105190084 A | 12/2015 |
| CN | 107250596 A | 10/2017 |

(Continued)

*Primary Examiner* — Robert A. Siconolfi
*Assistant Examiner* — James K Hsiao
(74) *Attorney, Agent, or Firm* — thyssenkrupp North America, LLC (57) ABSTRACT

A vibration damper for a motor vehicle includes an outer tube and an inner tube arranged coaxially within the outer tube. A guide unit closes the outer tube and the inner tube in each case at a first end. A bottom unit has a bottom valve. The bottom unit is arranged at a second end of the inner tube. The outer tube and the inner tube are deformed plastically, such that the guide unit is connected in a positively locking manner to the outer tube and the inner tube, and the inner tube being deformed plastically, such that the bottom unit is connected in a positively locking manner to the inner tube, and/or the outer tube and the inner tube is connected in an integrally joined manner to the guide unit, and the inner tube being connected in an integrally joined manner to the bottom unit.

12 Claims, 4 Drawing Sheets

(51) Int. Cl.
*F16F 9/18* (2006.01)
*B60G 13/08* (2006.01)

(52) U.S. Cl.
CPC .......... *F16F 9/364* (2013.01); *B60G 2202/24* (2013.01); *B60G 2206/41* (2013.01); *B60G 2206/82* (2013.01); *B60G 2206/8201* (2013.01); *B60G 2206/82092* (2013.01); *B60G 2800/162* (2013.01); *F16F 2222/12* (2013.01); *F16F 2226/04* (2013.01); *F16F 2226/045* (2013.01); *F16F 2226/048* (2013.01); *F16F 2230/0052* (2013.01); *F16F 2230/30* (2013.01); *F16F 2232/08* (2013.01); *F16F 2234/02* (2013.01)

(58) Field of Classification Search
CPC .. F16F 2226/04; F16F 9/3271; F16F 2222/12; F16F 2226/045; F16F 2226/048; F16F 2230/0052; F16F 2230/30; F16F 2232/08; F16F 223/02; B60G 13/08; B60G 2202/245; B60G 2206/82; B60G 2206/8201; B60G 2206/82092; B60G 2800/162
USPC ......................................................... 188/315
See application file for complete search history.

(56) References Cited

U.S. PATENT DOCUMENTS

| | | | | |
|---|---|---|---|---|
| 3,674,120 A * | 7/1972 | Johnson | F16F 9/52 | 236/93 R |
| 3,889,787 A * | 6/1975 | Zehring | F16F 9/3214 | 188/317 |
| 4,397,452 A * | 8/1983 | Fouts | F16F 9/062 | 267/221 |
| 4,441,593 A * | 4/1984 | Axthammer | B60G 15/062 | 267/221 |
| 4,485,899 A * | 12/1984 | Grundei | F16F 9/062 | 188/315 |
| 4,494,632 A * | 1/1985 | de Baan | F16F 9/364 | 188/269 |
| 4,633,983 A * | 1/1987 | Horvath | F16F 9/34 | 188/322.14 |
| 4,815,576 A * | 3/1989 | Tanaka | F16K 15/148 | 411/501 |
| 5,176,229 A * | 1/1993 | Kanari | F16F 9/364 | 188/315 |
| 5,441,132 A * | 8/1995 | Pradel | F16F 9/34 | 188/315 |
| 5,462,142 A * | 10/1995 | Handke | F16F 9/463 | 188/266.6 |
| 5,522,481 A * | 6/1996 | Watanabe | F16F 9/532 | 267/140.14 |
| 5,577,579 A * | 11/1996 | Derr | F16F 9/3271 | 188/315 |
| 5,615,867 A * | 4/1997 | Bauer | F16F 9/3242 | 267/64.11 |
| 5,651,433 A * | 7/1997 | Wirth | F16F 9/465 | 188/266.6 |
| 6,076,814 A * | 6/2000 | Grundei | F16F 1/322 | 267/221 |
| 6,450,306 B2 * | 9/2002 | Sasse | F16F 9/3235 | 188/315 |
| 8,689,953 B2 * | 4/2014 | Bauman | F16F 9/38 | 267/64.27 |
| 9,739,330 B2 * | 8/2017 | Reybrouck | F16F 9/185 | |
| 2001/0006135 A1 * | 7/2001 | Sasse | F16F 9/3235 | 188/315 |
| 2001/0013451 A1 * | 8/2001 | Grundei | F16F 9/3242 | 280/124.157 |
| 2003/0047398 A1 * | 3/2003 | Toiyama | F16F 9/092 | 188/314 |
| 2003/0136620 A1 * | 7/2003 | Krog | F16F 9/362 | 188/300 |
| 2005/0067237 A1 * | 3/2005 | Schurmans | F16F 9/52 | 188/276 |
| 2005/0121274 A1 * | 6/2005 | Fujita | F16F 9/38 | 188/322.19 |
| 2006/0081428 A1 * | 4/2006 | Schurmans | F16F 9/3242 | 188/322.19 |
| 2007/0000743 A1 * | 1/2007 | Naitou | B60G 15/12 | 188/322.2 |
| 2008/0224437 A1 * | 9/2008 | Vanhees | F16F 7/108 | 280/124.161 |
| 2009/0223763 A1 * | 9/2009 | Lude | F16F 9/065 | 188/322.15 |
| 2011/0284333 A1 * | 11/2011 | Krog | F16F 9/062 | 188/313 |
| 2013/0206524 A1 * | 8/2013 | Bohrer | F16F 9/19 | 188/317 |
| 2014/0090938 A1 * | 4/2014 | Nishimura | F16F 9/369 | 188/269 |
| 2014/0231198 A1 * | 8/2014 | Ackermann | F15B 15/1461 | 188/297 |
| 2014/0353099 A1 * | 12/2014 | Yamashita | F16F 9/512 | 188/314 |
| 2015/0300441 A1 * | 10/2015 | Lun | F16F 9/062 | 188/269 |
| 2015/0316119 A1 | 11/2015 | Lehnen et al. | | |
| 2016/0108985 A1 * | 4/2016 | Pniewski | F16F 9/084 | 267/64.27 |
| 2016/0146285 A1 | 5/2016 | Wilkin | | |
| 2016/0201751 A1 * | 7/2016 | Reybrouck | B60G 13/08 | 188/315 |
| 2016/0281815 A1 * | 9/2016 | Teraoka | F16F 9/061 | |
| 2017/0350464 A1 * | 12/2017 | Kato | F16J 15/56 | |
| 2018/0245660 A1 * | 8/2018 | Yamashita | F16F 9/34 | |
| 2018/0274702 A1 * | 9/2018 | Jackson | F16L 13/141 | |
| 2018/0355938 A1 * | 12/2018 | Tao | F16F 9/50 | |
| 2018/0355939 A1 * | 12/2018 | Zeissner | F16F 9/3271 | |
| 2020/0009933 A1 * | 1/2020 | Flint | F16F 9/3242 | |
| 2020/0180006 A1 * | 6/2020 | Jerisk | F16F 9/057 | |
| 2020/0309230 A1 * | 10/2020 | Woenarta | F16F 9/3257 | |
| 2022/0126644 A1 * | 4/2022 | Randall | B60G 13/08 | |
| 2022/0136294 A1 * | 5/2022 | Scheuring | E05C 17/30 | 16/85 |

FOREIGN PATENT DOCUMENTS

| | | |
|---|---|---|
| CN | 107939892 A | 4/2018 |
| DE | 32 10 518 A | 10/1983 |
| DE | 8 813 851 U | 1/1989 |
| DE | 19 628 152 A | 1/1998 |
| DE | 196 28 152 A1 | 1/1998 |
| DE | 100 00 179 A | 7/2001 |
| DE | 10 2011 087 597 A | 6/2013 |
| DE | 10 2015 224 811 A | 6/2017 |
| DE | 10 2017 001 133 A | 8/2018 |
| JP | 2010175042 A | 8/2010 |

* cited by examiner

VIBRATION DAMPER, AND MOTOR VEHICLE WITH A VIBRATION DAMPER OF THIS TYPE

CROSS REFERENCE TO RELATED APPLICATIONS

This application is a U.S. Non-Provisional Application which claims priority to German Patent Application No. DE 10 2019 131 319.8, filed Nov. 20, 2019, the entire contents of which are incorporated herein by reference.

FIELD

The present disclosure generally relates to a vibration damper and a motor vehicle.

BACKGROUND

Vibration dampers are usually used for motor vehicles and for sports vehicles and in the field of industry. In the case of vibration dampers, a distinction is generally made between monotube dampers and multitube dampers, twin tube dampers frequently being used as multitube dampers.

Twin tube dampers have substantially an inner tube and an outer tube which are arranged coaxially. A working piston is arranged movably in the inner tube, which working piston divides an interior space of the inner tube into a first and a second working space. Here, the working spaces are filled with a damper medium, for example with a damper oil. The working piston is connected fixedly to a piston rod, by way of which vibrations are introduced into the vibration damper and are damped by way of the latter. In the case of the compression of the piston rod into the inner tube, the damper oil flows from the first working space through the working piston into the second working space, part of the damper oil flowing by way of a bottom valve into a compensation space as a result of the additional volume of the piston rod which dips in. The compensation space is frequently configured between the outer tube and the inner tube. A damper gas for preloading the damper oil is introduced in the compensation space, which damper gas is compressed by way of the damper oil in the case of compression. In the case of rebound, the damper oil is transferred back into the working space of the inner tube again by way of the damper gas.

German Patent Application No. DE 10 2011 087 597 A1 which was cited at the outset has disclosed, for example, a twin tube damper, in the case of which the outer tube is closed on the piston rod side by way of a seal guide element. To this end, the outer tube is connected to the seal guide element in a non-positive manner by way of a press fit. In comparison with dampers, in the case of which the inner components are fastened in a positively locking manner, twin tube dampers of this type have increased complexity in the case of assembly of the individual damper parts. Furthermore, twin tube dampers of this type cannot be produced in existing manufacturing and/or assembly plants of monotube dampers, since they often do not have inner components which are pressed in, but rather are merely fastened in a positively locking manner. The production costs are increased as a result.

Thus a need exists for a vibration damper which can be produced inexpensively and is simplified by way of a structurally improved construction and a motor vehicle with a vibration damper.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a vibration damper and a motor vehicle.

Specifically, a vibration damper is disclosed for a motor vehicle, wherein the vibration damper has an outer tube and an inner tube which are arranged coaxially, which vibration damper comprises a guide unit which closes the outer tube and the inner tube in each case at a first end, and which vibration damper has a bottom unit which is arranged at a second end of the inner tube. The outer tube and the inner tube are deformed plastically, with the result that the guide unit is connected in a positively locking manner to the outer tube and the inner tube, and the inner tube is deformed plastically, with the result that the bottom unit is connected in a positively locking manner to the inner tube, and/or the outer tube and the inner tube are connected in an integrally joined manner to the guide unit, and the inner tube is connected in an integrally joined manner to the bottom unit.

The invention has various advantages. The positively locking connection of the outer tube and of the inner tube to the guide unit can be produced simply and rapidly by way of plastic deformation of the outer tube and of the inner tube, as a result of which costs are saved. In the case of the plastic deformation, the outer tube and the inner tube are deformed mechanically in such a way that a positively locking connection is formed between the respective tube and the corresponding unit. The plastic deformation of the outer tube and/or the inner tube can take place by way of crimping, rolling, caulking and/or lock-beading. The outer tube and the inner tube are deformed plastically in such a way that the inner tube is connected fixedly to the guide unit and the bottom unit, and the outer tube is connected fixedly to the guide unit. Here, the inner tube engages into the guide unit and the bottom unit, with the result that a positively locking connection is formed. Furthermore, the outer tube engages into the guide unit, with the result that a positively locking connection is formed.

A robust connection which is secured against failure is advantageously established by way of the integrally joined connection of the tubes to the respective unit. Furthermore, the integrally joined connection can be produced simply and inexpensively by way of conventional joining methods.

Furthermore, the positively locking and integrally joined connection has the advantage that pressing or prestressing of the guide unit and the bottom unit into the inner tube and/or the outer tube is dispensed with, as a result of which the assembly of the vibration damper is simplified considerably. In contrast to pressed-in inner components, as are known from German Patent Application No. DE 10 2011 087 597 A1, lower requirements are made of the dimensional accuracy for the inner components or the guide unit and the bottom unit of the vibration damper according to the invention, since pressing with an accurate fit is not required. Therefore, the guide unit and the bottom unit can be introduced into the outer tube in a facilitated manner, for example together with the inner tube. The production costs of the vibration damper are reduced as a result.

Furthermore, it is advantageous that the seal of the damper inner spaces is separated from the fixing of the guide unit and the bottom unit. In other words, the vibration damper is of structurally improved configuration as a result of functional separation.

The invention has the further advantage that, as a result of the connection of the outer and inner tube to the guide or bottom unit by way of plastic deformation of the two tubes, the vibration damper according to the invention can be produced on existing manufacturing and/or assembly plants for monotube dampers. In the case of the production of monotube dampers, the inner components are frequently fixed without press joints, that is to say preferably by way of positively locking connections, with the result that the vibration damper according to the invention can be manufactured on the existing plants for monotube dampers. As a result, the procurement of additional manufacturing or assembly plants is dispensed with, as a result of which costs are saved considerably.

The guide unit is arranged at a first (in particular, piston rod-side) end of the vibration damper. The guide unit serves for the closure of the inner and outer tube and for the guidance of a piston rod which extends out of the inner tube through the guide unit in the case of a rebound stage or retracts into the inner tube through the guide unit in the case of a compression stage.

The bottom unit is arranged at the second (in particular, bottom-side) end of the inner tube, the bottom valve regulating the throughflow of a damper medium, preferably of a damper oil, during operation, in particular in the case of a rebound stage or a compression stage.

In the case of one particularly preferred embodiment, the outer tube and the inner tube fix the guide unit and the bottom unit in position by way of the plastic deformation. The guide unit and the bottom unit can be fixed rotationally and axially. The outer tube and the inner tube can exhibit a plastic deformation which fixes or holds the guide unit and the bottom unit in their position. It is conceivable that the guide unit and the bottom unit are fixed in position exclusively by way of the plastic deformation of the outer tube and the inner tube. The positional fixing of the guide and bottom unit by way of the plastic deformation of the outer and inner tube can be produced simply and rapidly and therefore inexpensively.

In the case of a further particularly preferred embodiment, the outer tube and the inner tube are connected to the guide unit and/or the inner tube is connected to the bottom unit in a positively locking manner by way of crimping, rolling, caulking and/or lock-beading. In other words, the outer tube and the inner tube can be crimped, rolled, caulked and/or lock-beaded to the guide unit for the positively locking connection. In addition or as an alternative, the inner tube can be crimped, rolled, caulked and/or lock-beaded to the bottom unit for the positively locking connection. Here, the inner tube and the outer tube are preferably deformed plastically by way of at least one joining tool in such a way that at least one plastic deformation is formed which forms a positively locking connection with the guide unit and the bottom unit.

The configuration of the plastic deformation of the outer tube and the inner tube is not restricted to the above joining methods. In addition or as an alternative, further shaping methods which are not mentioned can be used for the configuration of the plastic deformation.

The outer tube and the inner tube are preferably connected to the guide unit in an integrally joined manner by way of welding. In addition or as an alternative, the inner tube can be connected to the bottom unit in an integrally joined manner by way of welding. As a result, a robust connection of the tubes to the respective unit is advantageously established.

In the case of one preferred embodiment, as a result of the plastic deformation, the outer tube has at least one first bead which is of radially inward configuration, and the guide unit has at least one first recess. Here, the first bead engages into the first recess, with the result that the guide unit is fixed in position in the outer tube. In other words, the first bead of the outer tube forms a positively locking connection with the first recess of the guide unit. This has the advantage that a fixed and/or stable connection which withstands the high operating pressures during operation is configured between the outer tube and the guide unit.

The first bead of the outer tube can protrude into the first recess of the guide unit, with the result that the said first bead holds the guide unit in a manner which is fixed against displacement and rotation. The first bead of the outer tube can fill the first recess of the guide unit completely or partially. The first bead of the outer tube can be in contact directly or indirectly with the first recess of the guide unit.

In the case of a further preferred embodiment, as a result of the plastic deformation, the inner tube has at least one first bead and at least one second bead which are of radially inward configuration. Here, the first bead engages into at least one first recess of the bottom unit, and the second bead engages into at least one second recess of the guide unit, with the result that the inner tube and the bottom unit are fixed in position in the outer tube. In other words, the first bead of the inner tube forms a positively locking connection to the first recess of the bottom unit, and the second bead of the inner tube forms a further positively locking connection to the second recess of the guide unit. This has the advantage that a connection which is simple to establish and is stable is configured between the inner tube and the guide unit as well as the bottom unit, in order to fix the position of the guide and bottom unit.

The first bead of the inner tube can protrude into the first recess of the bottom unit, with the result that the said first bead holds the bottom unit in a manner which is fixed against displacement and rotation. The two beads of the inner tube can fill the recesses of the guide unit and the bottom unit completely or partially. The two beads of the inner tube can be in contact directly or indirectly with the second recess of the guide unit and the first recess of the bottom unit.

The recesses are preferably of continuously circumferential or locally circumferential configuration. Continuously circumferential recesses facilitate the configuration of the positively locking connection between the two tubes with the corresponding join partner or the guide unit and/or the bottom unit, since the positively locking connection can be configured in the circumferential direction of the tubes independently of a rotational position of the tubes and the join partners. As a result, the assembly is simplified, with the result that costs are saved. As an alternative, a desired, fixed rotational orientation of the two tubes with respect to the respective join partner is simplified by way of the locally circumferential recesses.

In order to connect the tubes to the respective unit in a positively locking manner by way of plastic deformation, the guide and bottom unit have the above-described recesses. The recesses are therefore suitable for interacting with the respective tube in a positively locking manner. In the case of an integrally joined connection of the tubes to the respective unit, the guide and/or bottom unit can have a smooth wall at least in sections, to which smooth wall the respective tube is welded. It is conceivable here that the wall of the guide unit and the bottom unit is of completely smooth configuration (in particular, free from recesses) in the region of the integrally joined connection.

In the case of a further preferred embodiment, as a result of the plastic deformation, the outer tube has at least one second bead which is of radially inward configuration, and the guide unit has a guide plate with a guide sleeve, the second bead being pressed on the guide plate. The guide plate with the guide sleeve can be pressed in the axial and/or radial direction by way of the second bead of the outer tube, with the result that the guide plate with the guide sleeve is held in a positionally fixed manner. The guide sleeve serves for the axial guidance of the piston rod. In other words, the piston rod is guided axially displaceably by way of the guide sleeve. The second bead of the outer tube has the advantage that the guide unit is fixed on the outer tube in an improved manner and therefore the functional reliability is increased.

In general, the outer tube and the inner tube can have a plurality of beads which are configured distributed uniformly in the circumferential direction on the outer tube and/or on the inner tube. As a result, the stability and therefore the security against failure of the positively locking connection between the respective tube and the respective unit are increased.

The guide unit and the bottom unit preferably have in each case at least one first seal element which seals the guide unit and the bottom unit in a fluid-tight manner towards the inner tube. To this end, the respective seal element can interact in a fluid-tight manner with an inner face of the inner tube, or can be in direct contact with the latter. As a result, the interior space or the two working spaces of the inner tube is/are advantageously sealed towards the outside. This contributes to ensuring the functional reliability of the vibration damper.

In the case of one preferred embodiment, the guide unit and the bottom unit in each case have a seal region which receives the first seal element and protrudes into the inner tube. The first seal element can be arranged axially within the respective bead of the inner tube. In other words, the first seal element is arranged within the respective bead of the inner tube in the longitudinal direction towards the inner tube centre. The respective first seal element is therefore arranged at a deeper level in the inner tube than the respective first bead of the inner tube.

The bottom unit preferably has at least one second seal element which is arranged radially on the outside and seals the bottom unit towards the outer tube. This ensures a controlled throughflow of the damper medium between the compensation space and the interior space of the inner tube.

According to the disclosure, the invention relates to a motor vehicle with at least one vibration damper according to the invention. Here, reference is made to the advantages which are described in conjunction with the vibration damper. Moreover, as an alternative or in addition, the motor vehicle can have individual features or a combination of a plurality of features which have previously been mentioned in relation to the vibration damper.

Figure 1:
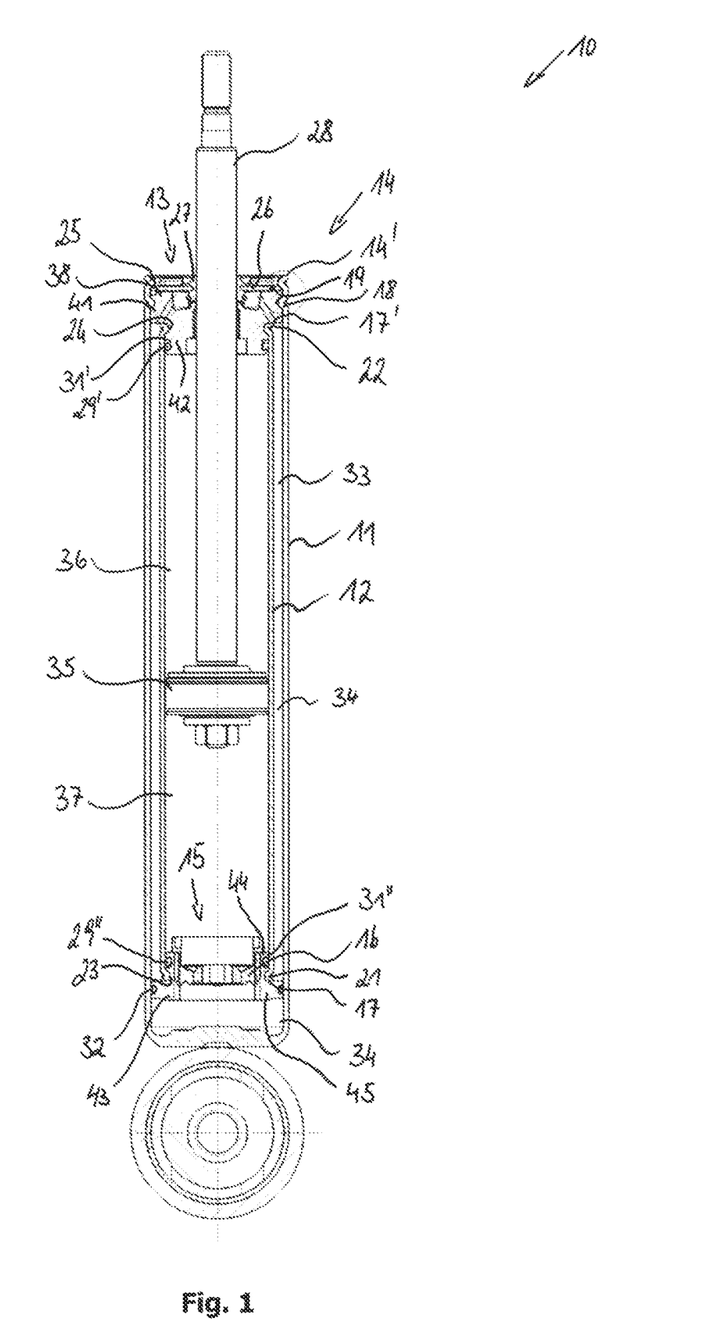
FIG. 1 is a longitudinal sectional view through a vibration damper in accordance with one preferred exemplary embodiment.
Figure 2:
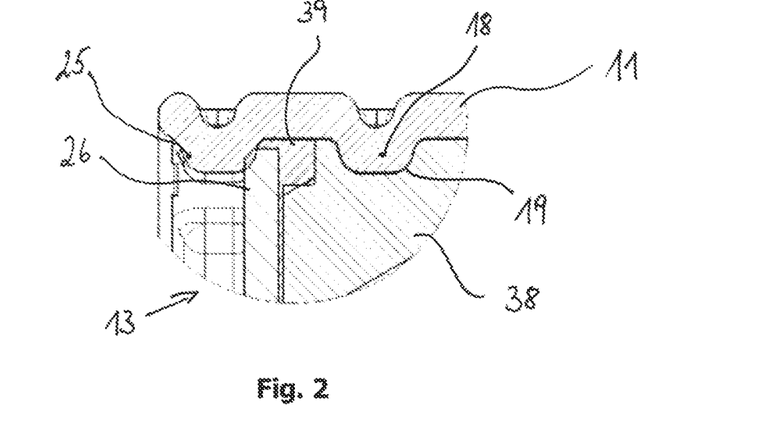
FIG. 2 is a detailed view of a positively locking connection between an outer tube and a guide unit of the vibration damper according to FIG. 1.
Figure 3:
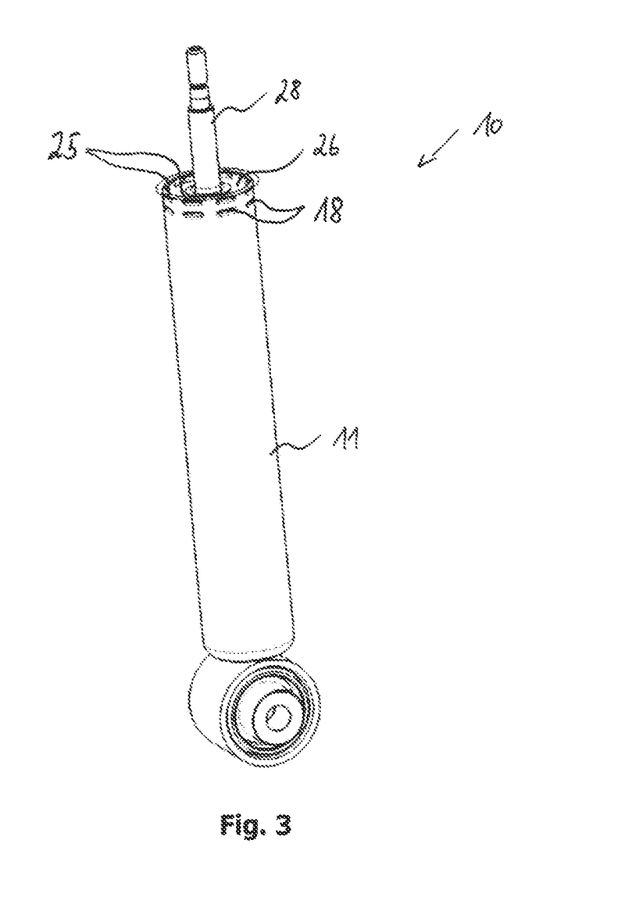
FIG. 3 is a perspective view of the vibration damper according to FIG. 1.
Figure 4:
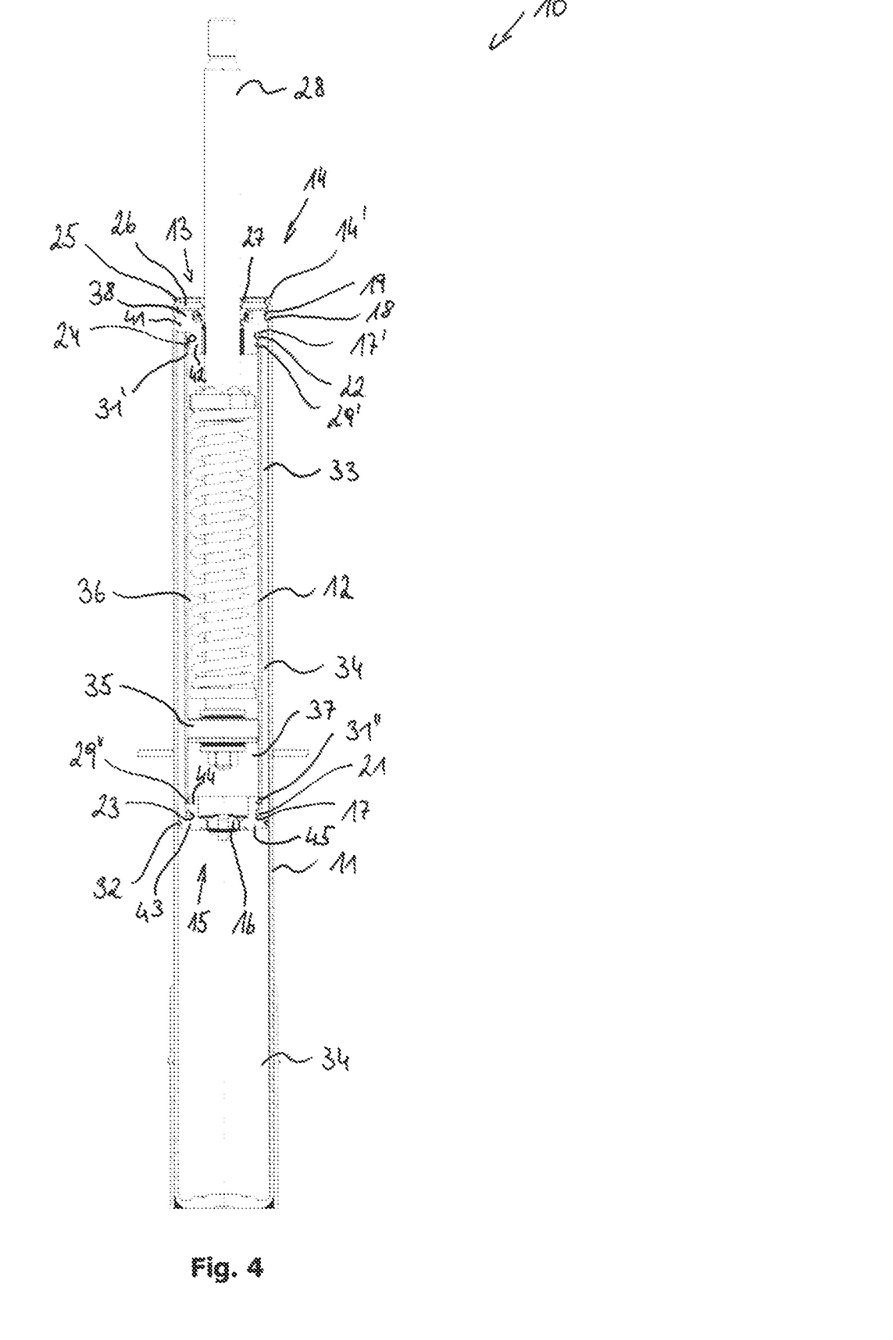
FIG. 4 is a longitudinal sectional view through a vibration damper in accordance with a further preferred exemplary embodiment.
Figure 5:
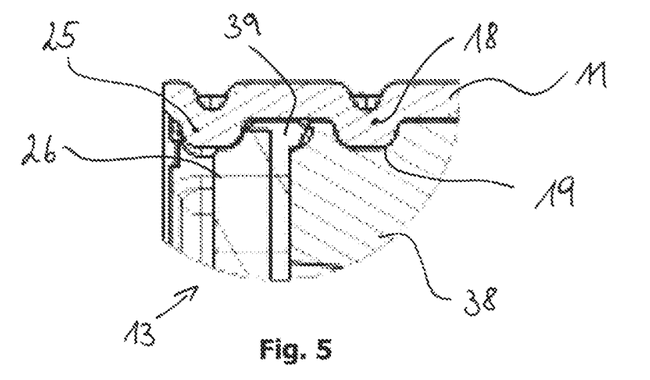
FIG. 5 is a detailed view of a positively locking connection between an outer tube and a guide unit of the vibration damper according to FIG. 4.
Figure 6:
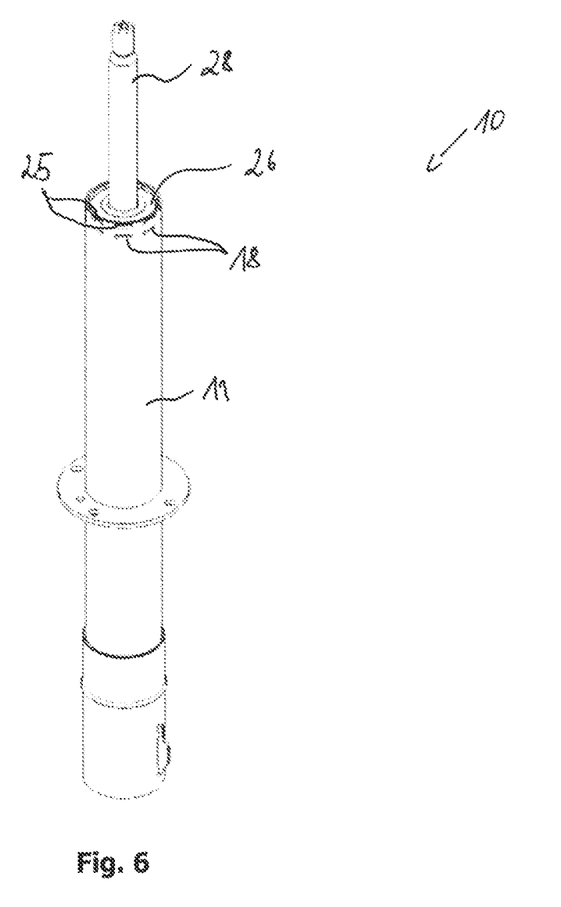
FIG. 6 is a perspective view of the vibration damper according to FIG. 4.

FIG. 1 and FIG. 4 in each case show a longitudinal section of a vibration damper 10, in particular of a twin tube damper, in accordance with a respective exemplary embodiment according to the invention. Specifically, FIGS. 1 to 3 show a first exemplary embodiment according to the invention of the vibration damper 10, and FIGS. 4 to 6 show a second exemplary embodiment according to the invention of the vibration damper 10. In the following text, the two exemplary embodiments of the vibration damper 10 are described.

The vibration damper 10 according to FIGS. 1 and 4 is called a twin tube damper in the following text. The twin tube damper has an outer tube 11 and an inner tube 12 which are arranged coaxially. The inner tube 12 is arranged on the outer tube 11. An annular gap 33 is configured between the outer tube 11 and the inner tube 12, which annular gap 33 forms a compensation space 34 for receiving a damper gas and a damper oil. The tubes 11, 12 will be described in greater detail later.

Furthermore, the twin tube damper has a piston 35 which divides an interior space of the inner tube 12 into a first working space 36 and a second working space 37. The working spaces 36, 37 are filled with a damper oil. The piston 35 is arranged axially displaceably in the inner tube 12, and is connected to a distal end of a piston rod 28.

Furthermore, the twin tube damper has a guide unit 13 which is arranged at a first (in particular, piston rod-side) end 14 of the twin tube damper. The guide unit 13 closes the outer tube 11 and the inner tube 12, the piston rod 28 being guided axially displaceably in the guide unit 13. During operation, the piston rod 28 retracts through the guide unit 13 into the inner tube 12 in the case of a compression stage, and extends through the guide unit 13 out of the inner tube 12 in the case of a rebound stage.

According to FIGS. 1 and 2 and FIGS. 4 and 5, the guide unit 13 comprises a guide body 38, a guide plate 26 with a guide sleeve 27, and an intermediate element 39. The guide body 38 has two recesses 19, 24 which are of radially outwardly circumferential configuration on the guide body 38. The two recesses 19, 24 can be of continuously circumferential or locally circumferential configuration.

Specifically, a first recess 19 is configured in a first axial portion 41 of the guide body 38, and a second recess 24 is configured in a second axial portion 42 of the guide body 38. The first axial portion 41 is arranged axially on the outside in relation to the inner tube 12, and the second axial portion 42 is arranged axially on the inside. The first axial portion 41 protrudes beyond the second axial portion 42 radially, the first axial portion 41 being in contact directly with the outer tube 11, and the second axial portion 42 being in contact directly with the inner tube 11.

As is shown in FIGS. 1 to 3 and in FIGS. 4 to 6, the outer tube 11 and the inner tube 12 are deformed plastically in such a way that they have a plurality of beads 18, 21, 22, 25. Specifically, the outer tube 11 has a plurality of first beads 18 and a plurality of second beads 25. As an alternative, the outer tube 11 can have a single first bead 18 and a single second bead 25. The beads 18, 25 of the outer tube 11 are configured at the first (in particular, piston-side) end 14' of the outer tube 11. Furthermore, the inner tube 12 has a plurality of first beads 21 and a plurality of second beads 22. It is also conceivable that the inner tube 12 has a single first bead 21 and a single second bead 22. The first bead 21 of the inner tube 12 is arranged at the first (in particular, piston rod-side) end 17' of the inner tube 12. The second bead 22 of the inner tube 12 is arranged at the second (in particular, lying opposite the first end 17') end 17 of the inner tube 12.

The beads 18, 21, 22, 25 are of radially inward configuration as a result of the plastic deformation of the tubes 11, 12. The beads 18, 21, 22, 25 can be of locally circumferential or continuously circumferential configuration. As can be seen in FIGS. 3 and 6, the beads 18, 25 are configured distributed uniformly in the circumferential direction in the outer tube 11. The beads 21, 22 of the inner tube 12 can likewise be configured distributed uniformly in the circumferential direction in the inner tube 12.

As can be seen clearly in FIGS. 2 and 5, the outer tube 11 is deformed plastically in such a way that the first bead 18 engages into the first recess 19 of the guide body 38 of the guide unit 13. In other words, the outer tube 11 and the guide body 38 of the guide unit 13 are connected in a positively locking manner by way of the first bead 18 and the first recess 19. The outer tube 11 is connected to the guide body 38 of the guide unit 13 in a positively locking manner by way of lock-beading. As an alternative, the outer tube 11 can also be connected to the guide body 38 of the guide unit 13 in a positively locking manner by way of crimping, rolling and/or caulking. As a result of the lock-beading, the outer tube 11 is deformed plastically in such a way that the first bead 18 is pressed into the first recess 19 of the guide unit 13. In other words, the outer tube 11 is connected to the guide body 38 of the guide unit 13 in a positively locking and non-positive manner by way of lock-beading. The guide body 38 of the guide unit 13 is fixed in position by way of the first bead 18 in the outer tube 11.

Furthermore, FIGS. 2 and 5 show the second bead 25 of the outer tube 11, which second bead 25 is of radially inward configuration as a result of plastic deformation of the outer tube 11. The second bead 25 is pressed onto the guide plate 26, with the result that the guide plate 26 with the guide sleeve 27 is fixed. The guide sleeve 27 serves for the guidance of the piston rod 28. The guide plate 26 is arranged between the first bead 18 and the second bead 25, the guide plate 26 being supported via an intermediate element 39 on the guide body 38 of the guide unit 13. The intermediate element 39 can be of annular configuration. An axial press joint is formed between the guide body 38, the intermediate element 39 and the guide plate 26 by way of the two beads 18, 25 of the outer tube 11.

According to FIGS. 1 and 4, the second axial portion 42 of the guide body 38 of the guide unit 13 protrudes into the inner tube 12, and has a seal region 31' which receives a first seal element 29'. The first seal element 29' interacts in a fluid-tight manner with an inner face of the inner tube 12. In other words, the first seal element 29' seals the guide body 38 of the guide unit 13 towards the inner tube 12.

The second recess 24 of the guide unit 13 is configured in the transition between the seal region 31' and the first axial portion 41 of the guide body 38. The inner tube 12 is deformed plastically in the region of the second recess 24 in such a way that the second bead 22 engages into the second recess 24 of the guide body 38 of the guide unit 13. In other words, the inner tube 12 and the guide body 38 of the guide unit 13 are connected in a positively locking manner by way of the second bead 22 of the inner tube 12 and the second recess 24 of the guide body 38.

The inner tube 12 is connected to the guide body 38 of the guide unit 13 in a positively locking manner by way of lock-beading. As an alternative, the inner tube 12 can also be connected to the guide body 38 of the guide unit 13 in a positively locking manner by way of crimping, rolling and/or caulking. As a result of the lock-beading, the inner tube 12 is deformed plastically in such a way that the second bead 22 is pressed into the second recess 24 of the guide unit 13. In other words, the inner tube 12 is connected to the guide body 38 of the guide unit 13 in a positively locking and non-positive manner by way of lock-beading. The inner tube 12 is fixed in position on the guide body 38 of the guide unit 13 by way of the second bead 22. The second bead 22 of the inner tube 12 is arranged in the axial direction between the first seal element 29' and the first bead 18 of the outer tube 12. In other words, the first seal element 29' of the guide unit 13 is arranged in the axial direction within the second bead 22 of the inner tube 12.

Furthermore, the twin tube damper comprises a bottom unit 15 with a bottom valve 16 and a bottom body 43, in which the bottom valve 16 is arranged. The bottom unit 15 is arranged at the second end 17 of the inner tube 12. The bottom body 43 has a first recess 23 which is configured in a radially outwardly circumferential manner in the bottom body 43. The recess 23 can be of continuously circumferential or locally circumferential configuration. Specifically, the first recess 23 is configured in a first axial portion 44 of the bottom body 43.

The bottom body 43 has a second axial portion 45 which adjoins the first axial portion 44. In relation to the inner tube 12, the first axial portion 44 is arranged axially on the inside, and the second axial portion 45 is arranged axially on the outside. The second axial portion 45 protrudes beyond the first axial portion 44 radially to the outside, the second axial portion 45 being in contact directly with the outer tube 11, and the first axial portion 44 being in contact directly with the inner tube 11.

According to FIGS. 1 and 4, the first axial portion 44 of the bottom body 43 of the bottom unit 15 protrudes into the inner tube 12, and has a seal region 31" which receives a first seal element 29". The first seal element 29" interacts in a fluid-tight manner with the inner face of the inner tube 12. In other words, the first seal element 29" seals the bottom body 43 of the bottom unit 15 towards the inner tube 12. A second seal element 32 is arranged radially on the outside in the second axial portion 45 of the bottom body 43. The second seal element 32 interacts in a fluid-tight manner with the outer tube 11. The seal elements 29', 29", 32 can be formed in each case by way of an O-ring.

The first recess 23 of the bottom unit 15 is configured in the transition between the seal region 31" and the second axial portion 44 of the bottom body 43. The inner tube 12 is deformed plastically in the region of the first recess 23 in such a way that the first bead 21 engages into the first recess 23 of the bottom body 43 of the bottom unit 15. In other words, the inner tube 12 and the bottom body 43 are connected in a positively locking manner by way of the first bead 21 of the inner tube 12 and the first recess 23 of the bottom body 43.

The inner tube 12 is connected to the bottom body 43 in a positively locking manner by way of lock-beading. As an alternative, the inner tube 12 can also be connected to the bottom body 43 in a positively locking manner by way of crimping, rolling and/or caulking. As a result of the lock-beading, the inner tube 12 is deformed plastically in such a way that the first bead 21 is pressed into the first recess 23 of the bottom body 43. In other words, the inner tube 12 is connected to the bottom body 43 of the bottom unit 15 in a positively locking and non-positive manner by way of lock-beading. The inner tube 12 is held in position on the bottom body 43 of the bottom unit 15 by way of the first bead 21. The first bead 21 of the inner tube 12 is arranged in the axial direction between the first seal element 29" of the bottom unit 15 and the second seal element 32 of the bottom unit 15. In other words, the first seal element 29" of the bottom unit 15 is arranged in the axial direction within the first bead 21 of the inner tube 12.

List of Reference Numerals

10 Vibration damper
11 Outer tube
12 Inner tube
13 Guide unit
14 First end of the vibration damper
14' First end of the outer tube
15 Bottom unit
16 Bottom valve
17 Second end of the inner tube
17' First end of the inner tube
18 First bead of the outer tube
19 First recess of the guide unit
21 First bead of the inner tube
22 Second bead of the inner tube
23 First recess of the bottom unit
24 Second recess of the guide unit
25 Second bead of the outer tube
26 Guide plate
27 Guide sleeve
28 Piston rod
29', 29" First seal element
31', 31" Seal region
32 Second seal element
33 Annular gap
34 Compensation space
35 Piston
36 First working space
37 Second working space
38 Guide body
39 Intermediate element
41 First axial portion of the guide body
42 Second axial portion of the guide body
43 Bottom body
44 First axial portion of the bottom body
45 Second axial portion of the bottom body

What is claimed is:

1. A vibration damper for a motor vehicle, comprising:
an outer tube;
an inner tube arranged coaxially within the outer tube;
a guide unit which closes a first end of the outer tube and a first end of the inner tube; and
a bottom unit arranged at a second end of the inner tube;
wherein the outer tube and the inner tube are deformed plastically, such that the guide unit is connected in a positively locking manner to the outer tube and the inner tube, and the inner tube is deformed plastically, such that the bottom unit is connected in a positively locking manner to the inner tube, and/or the outer tube and the inner tube are connected in an integrally joined manner to the guide unit, and the inner tube is connected in an integrally joined manner to the bottom unit,
wherein as a result of the plastic deformation, the inner tube has at least one first bead and at least one second bead which are of radially inward configuration, the first bead engaging into at least one first recess of the bottom unit, and the second bead engaging into at least one second recess of the guide unit, with the result that the inner tube and the bottom unit are fixed in position in the outer tube.

2. The vibration damper of claim 1 wherein the outer tube and the inner tube fix the guide unit and the bottom unit in position by way of the plastic deformation.

3. The vibration damper of claim 1 wherein the outer tube and the inner tube are connected to the guide unit and/or the inner tube is connected to the bottom unit in a positively locking manner by way of crimping, rolling, caulking and/or lock-beading.

4. The vibration damper of claim 1 wherein the outer tube and the inner tube are connected to the guide unit and/or the inner tube is connected to the bottom unit in an integrally joined manner by way of welding.

5. The vibration damper of claim 1 wherein as a result of the plastic deformation, the outer tube has at least one first bead that faces radially inward, and the guide unit has at least one first recess, the first bead engaging into the first recess, such that the guide unit is fixed in position in the outer tube.

6. The vibration damper of claim 5 wherein the recesses are of continuously circumferential or locally circumferential configuration.

7. The vibration damper of claim 5 wherein as a result of the plastic deformation, the outer tube has at least one second bead which is of radially inward configuration, and the guide unit has a guide plate with a guide sleeve for guiding a piston rod, the second bead being pressed on the guide plate.

8. The vibration damper of claim 1 wherein the outer tube and the inner tube have a plurality of beads which are distributed uniformly in the circumferential direction in the outer tube and/or in the inner tube.

9. The vibration damper of claim 1 wherein the guide unit and the bottom unit have in each case at least one first seal element that seals the guide unit and the bottom unit in a fluid-tight manner towards the inner tube.

10. The vibration damper of claim 9 wherein the guide unit and the bottom unit in each case have a seal region that receives the first seal element and protrudes into the inner tube, wherein each first seal element is arranged within a respective bead of the inner tube at an axial location.

11. The vibration damper of claim 9 wherein the bottom unit has at least one second seal element that is arranged radially on an outside of the bottom unit and seals the bottom unit towards the outer tube.

12. A motor vehicle comprising the vibration damper of claim 1.

* * * * *